United States Patent [19]

Oki et al.

[11] Patent Number: 5,466,737

[45] Date of Patent: Nov. 14, 1995

[54] POLYIMIDE RESIN COMPOSITION FOR SLIDING MEMBERS

[75] Inventors: Yoshio Oki, Yokkaichi; Takumi Shimokusuzono, Inabe, both of Japan

[73] Assignee: NTN Corporation, Osaka, Japan

[21] Appl. No.: 172,237

[22] Filed: Dec. 23, 1993

[30] Foreign Application Priority Data

Dec. 24, 1992 [JP] Japan ................................ 4-344700

[51] Int. Cl.⁶ .................................................. C08K 3/04
[52] U.S. Cl. ...................... 524/495; 524/496; 524/508; 524/514; 525/133
[58] Field of Search ............................. 525/180; 524/495

[56] References Cited

U.S. PATENT DOCUMENTS

| | | | |
|---|---|---|---|
| 4,532,054 | 7/1985 | Johnson | 252/12.4 |
| 4,816,516 | 3/1989 | Yamaya et al. | 525/180 |
| 4,898,905 | 2/1990 | Kawakami et al. | 524/404 |
| 5,179,153 | 1/1993 | George | 524/495 |

FOREIGN PATENT DOCUMENTS 2321877  12/1974  Germany .................... 525/180

*Primary Examiner*—Ana L. Carrillo
*Attorney, Agent, or Firm*—Nikaido Marmelstein Murray & Oram

[57] ABSTRACT

A polyimide resin composition for sliding members which has high heat resistance and sliding properties and excels in wear resistance under sliding conditions at high PV values and which can keep low the rate of shrinkage due to crystallization treatment. The composition is made up of 100 parts by weight of resin composition comprising 50–90% by weight of a thermoplastic polyimide resin and 50–10% by weight of graphite obtained by graphitizing a non-phenolic resin material and containing 97% or more of fixed carbon; 5–20 parts by weight of tetrafluoroethylene resin; and 5–30 parts by weight of a powdery hardened phenolic resin.

7 Claims, No Drawings

POLYIMIDE RESIN COMPOSITION FOR SLIDING MEMBERS

This invention relates to a polyimide resin composition for sliding members used under conditions where dynamically and thermally high loads are applied.

Polyimide resins have high heat resistance and their properties have been improved so that they can be used as sliding members under harsh conditions where they are subjected to high-load, high-speed sliding contacts at high temperatures.

It is disclosed in Unexamined Japanese Patent Publication 63-8455 to improve the sliding properties of polyimide resins by adding tetrafluoroethylene resin thereto. Also, Unexamined Japanese Patent Publication 63-314274 discloses that the wear resistance of polyimide resins is improved by adding thereto hardened phenolic resin as well as tetrafluoroethylene resin.

But such a conventional polyimide resin composition for sliding members, comprising a polyimide resin, tetrafluoroethylene resin and hardened phenolic resin, tends to be low in wear resistance at temperatures near the glass transition temperature (Tg=240° C.) of polyimide resin if it works at a high PV rate, e.g. 640 kg/cm$^2$ m/min.

In order to improve the wear resistance under the above-described harsh conditions it is known, to subject a thermoplastic polyimide resin to heat treatment to increase its crystallinity to 25%. But the resin article shrinks at a rate of as much as 2–5% when subjected to crystallization treatment. Thus, it is difficult to control the dimensions of the end products with high accuracy.

It is disclosed in Unexamined Japanese Patent Publications 4-175373 and 4-202470 to reduce the rate of shrinkage due to crystallization treatment by adding a thermotropic liquid crystal polymer. The liquid crystal polymer serves to reduce the coefficient of linear expansion by being highly orientated and thus improve the dimensional accuracy of the end product.

But since a composition comprising a thermotropic liquid crystal polymer and a thermoplastic polyimide resin is non-compatible, its wear resistance scarcely improves.

It is an object of this invention to provide a polyimide resin composition for sliding members which has high heat resistance and excellent sliding properties, which has high wear resistance under sliding conditions at high PV values and which can keep the rate of shrinkage due to crystallization treatment low so that the dimensional accuracy of the article can be controlled easily.

According to the present invention, there is provided a polyimide resin composition for sliding members comprising 100 parts by weight of resin composition comprising 50–90% by weight of a thermoplastic polyimide resin represented by the following formula (1) and 50–10% by weight of graphite, the graphite can be obtained by graphitizing a non-phenolic resin material or natural graphite can be used. The graphite contains 97% or more of fixed carbon; 5–20 parts by weight of tetrafluoroethylene resin; and 5–30 parts by weight of a powdery hardened phenolic resin.

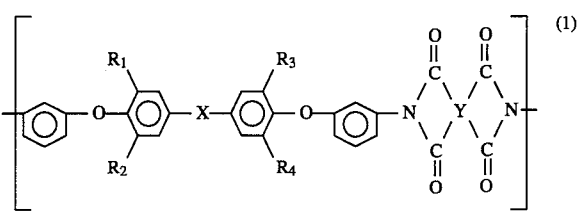

(wherein X is a member selected from the group consisting of a direct bond, a hydrocarbon group having a carbon number of 1–10, a hexafluorinated isopropylidene group, a carbonyl group, a thio group and a sulfone group; R1–R4 may be the same or different and are selected from at least one of hydrogen, a lower alkyl group, a lower alkoxy group, chlorine or bromine and; Y is a quadrivalent group selected from the group consisting of an aliphatic group having a carbon number of two or more, a cyclic aliphatic group, a monocyclic aromatic group, a condensed polycyclic aromatic group, and a non-condensed polycyclic aromatic group in which aromatic groups are bonded together directly or through crosslinking agent.

The above-mentioned graphite containing 97% or more of fixed carbon should preferably be scaly natural graphite.

Further, 1–5 parts by weight of a thermotropic liquid crystal polymer expressed by the following formula may be added to the aforementioned polyimide resin composition for sliding members.

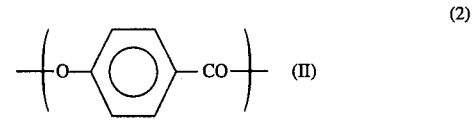

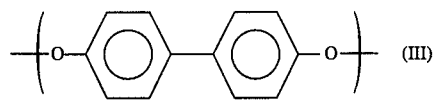

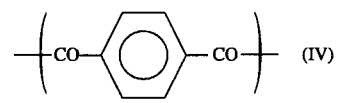

The thermoplastic polyimide resin used in the present invention and expressed by the formula (1) can be obtained by cyclodehydrating a polyamide acid obtained by reacting an aromatic ether diamine expressed by the following formula (3) with one or more tetracarbonic acid-anhydrodes.

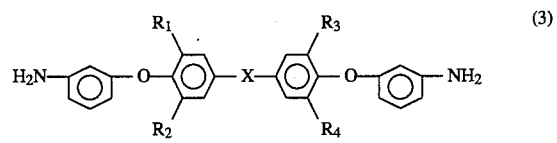

wherein X is a member selected from the group consisting of a direct bond, a hydrocarbon group having a carbon number of 1–10, a hexafluorinated isopropylidene group, a carbonyl group, a thio group and a sulfone group; and R1–R4 are the same or different and are selected from at least one of hydrogen, a lower alkyl group, a lower alkoxy group, chlorine or bromine.

One of such polyimide resins is sold by Mitsui Toatsu Chemical Co. under the name of AURUM (in which R1–R4 in the formula (1) are all hydrogen).

The graphite used in this invention, which contains 97% or more of fixed carbon, may be scale-like natural graphite that is dug out of the ground or artificial graphite. It was found out by experiments that among natural graphites, scale-like graphite having an average diameter of about 10 µm is especially preferable in attaining the object of this invention.

Artificial graphite is preferable which is formed by solidifying coke originating from pitch with tar or pitch, calcining it at about 1200° C. and growing graphite crystals at about 2300° C. in a graphitizing furnace. Artificial graphite should be formed, not from a phenolic resin, but from pitch, coal tar, coke, wooden material, furan resin or polyacrylonitrile. This is because it is not preferable to use graphite formed from a phenolic resin in combination with a hardened phenolic resin which has been added to the resin composition according to the present invention.

The fixed carbon in the graphite is the component that remains when the water, ash and volatile contents have been measured and removed by an industrial analysis in a coal testing method. Its main component is carbon with trace amounts of hydrogen, oxygen and nitrogen contained therein. If the content of fixed carbon is less than 97%, the end product obtained will not be satisfactory both in wear resistance and the rate of shrinkage due to crystallization treatment.

The graphite, which contains 97% or more of fixed carbon, should be added in an amount of 50–10% by weight in combination with 50–90% by weight of thermoplastic polyimide resin to make up the 100 parts of resin composition. If over 50% by weight, the melt viscosity of the composition would be too large for melt forming. If less than 10% by weight, the wear resistance would not be improved sufficiently.

The tetrafluoroethylene used in this invention should preferably be in a powdery form so that it can be homogeneously mixed in the composition. For example, it may be in the form of molding powder, fine powder or powder obtained by pulverizing a molded and calcined resin by irradiation with electron beams or as gamma rays.

The tetrafluoroethylene resin should be added in an amount of 5–20 parts by weight with respect to 100 parts by weight of the composition comprising thermoplastic polyimide resin and graphite. If less than 5 parts, it would not impart sufficient sliding properties to the thermoplastic polyimide resin composition. If over 20 parts, the mechanical strength inherent in the thermoplastic resin would be hampered.

The hardened phenolic resin in a powdery form used in this invention may be produced by heating a novolak or resol type phenolic resin, which is produced by adding a formalin-producing compound to a phenol, after adding known fillers as necessary, with or without crosslinking agents such as hexamine, and then pulverizing the thus hardened resin. Methods for producing such powder are disclosed in Unexamined Japanese Patent Publications 57-17701 and 58-17114. One of such resins is commercially available under the name of BELL-PEARL made by Kanebo.

The phenolic resin should be a heat-unmeltable powdery resin. Preferably, such resins should have an average particle diameter of 50 µm or less and 80% or more of them should have a particle diameter not exceeding 150 µm. If over 150 µm, the adhesion between particles would be insufficient, so that the mechanical strengths of the formed article such as wear resistance and bending strength would decrease.

Further, the hardened phenolic resin used in this invention should be hardened sufficiently. For example, if the degree of hardness is represented in terms of the solubility in methanol, the solubility should be 20% by weight or less, preferably 15% by weight or less and most preferably 5% by weight. If the solubility is higher than 20% by weight, foaming would occur while molding. The product thus formed will develop gaps and small cracks therein.

The hardened phenolic resin should be added in an amount of 5–30 parts by weight with respect to 100 parts by weight of the composition comprising thermoplastic polyimide resin and graphite. If less than 5 parts by weight, the wear resistance would scarcely improve. If more than 30 parts by weight, the melt viscosity of the composition would be too high for melt forming. Also, if too much hardened phenolic resin is added, it is impossible to lower the friction coefficient.

The thermotropic liquid crystal polymer (hereinafter abbreviated as LCP) used in the present invention should have a basic structure (II)–(IV) as shown in Formula (4). For example, commercially available XYDAR: made by Japan Petrochemical, or SUMIKA SUPER: made by Sumitomo Chemical Co., Ltd. may be used.

If 1–5 parts by weight of LCP is added into the composition, the flowability while molding can be improved and the rate of shrinkage during crystallization can be reduced. If less than 1 part by weight is added, no effect such as improvement in flowability or prevention of shrinkage during crystallization would appear. If over 5 parts by weight are added, the wear resistance would be damaged markedly.

Various known additives including the following additives may be added provided their amounts are controlled so as not to impair achieving the object of the present invention.

The following additives may be added:

1) Reinforcing agents such as glass fiber, carbon fiber, boron fiber, silicon carbide fiber, carbon whisker, asbestos, metallic fiber and rock wool;
2) Flame retardancy improvers such as antimony trioxide, magnesium carbonate and calcium carbonate;
3) Electrical property improvers such as clay and mica;
4) Crack resistance improvers such as asbestos, silica and graphite;
5) Thermal conductivity improvers such as iron, zinc, aluminum, copper and other metallic powders; and
6) Other fillers such as glass beads, glass baloons, calcium carbonate, alumina, talc, diatomaceous earth, alumina hydrate, shirasu balloons and other metallic oxides and inorganic pigments, namely natural or artificial compounds which are stable at temperatures above 300° C.

Means for mixing the above-mentioned component materials is not limited. The materials may be fed separately into a melting mixer or two or more of the materials may be mixed together beforehand using a general purpose mixer such as a Henschel mixer, ball mixer or ribbon blender. In this case, they should be mixed at 250°–420° C., preferably at 300°–400° C. The composition may be molded by compression molding or sintering molding. Otherwise, it may be injection— or extrusion-molded after forming a homogeneous molten blend.

The polyimide resin composition for sliding members according to this invention has a heat-resistant polyimide resin as its matrix and tetrafluoroethylene resin, which is excellent in reducing the friction coefficient. Thus, the composition shows high heat resistance and excellent frictional properties. Further, by adding predetermined amounts of powdery hardened phenolic resin and graphite containing a predetermined amount of fixed carbon, the wear resistance improves and the rate of shrinkage during crystallization can be reduced. Thus, its dimensions can be controlled easily and with high accuracy.

The raw materials used in Examples and Comparative Examples are listed below. The contents are in weight percent. Their abbreviations are shown in brackets.

(1) Thermoplastic polyimide resin (TPI) made by Mitsui Toatsu Chemical Co.: AURUM #450.
(2) Scaly natural graphite (scale graphite) provided by Japan Graphite: ACP (containing 99.5% fixed carbon)
(3) Artificial graphite (round graphite) made by LONZA JAPAN: KS10 (containing 99.5% fixed carbon)
(4) Earth-particle-like graphite (EPL graphite) made by Japan Graphite: Blue P (containing 92.5% fixed carbon)
(5) Thermotropic liquid crystal polymer (LCP) made by Sumitomo Chemical Co., Ltd.: SUMIKA SUPER E5000
(6) Powdery hardened phenolic resin (PF-1) made by Kanebo: BELL-PEARL C2000 (average particle diameter: 48 μm)
(7) Powdery hardened phenolic resin (PF-2) made by Kanebo: BELL-PEARL R900 (average particle diameter: 22 μm)
(8) Tetrafluoroethylene resin (PTFE) made by Kitamura: KTL610

(EXAMPLES 1–8 AND COMPARATIVE EXAMPLES 1–8)

Raw materials were added at the rates shown in Tables 1 and 2. After dry-blending, they were granulated by extruding at 370°–400° C. using a twin-screw melt extruder. The pellets thus obtained were fed into an injection molder and injection-molded under the injection pressure of 1000 kgf/cm$^2$, keeping the cylinder temperature at 370°–400° C. and the metal mold temperature at 150°–200° C. The test pieces thus obtained were measured for (1) friction coefficient, (2) wear coefficient, (3) limit PV value, (4) flexural modulus and (5) change in dimensions due to crystallization treatment in the following ways. The results are shown in Tables 3 and 4.

(1) Friction coefficient

Friction coefficients of the test pieces were measured using a thrust type friction/wear tester (made by the applicant), causing them to slide on a mating member made of SUJ2 at the surface pressure of 5.0 kg/cm$^2$ and the sliding speed of 128 m/minute with no lubrication for 60 minutes.

Wear coefficient×10$^{-10}$

We used the same tester as used in the measurement of friction coefficient. The wear coefficients (cm$^3$/kgf.m) of the test pieces were measured from the results of the wear test in an amorphous state and in the state after crystallization treatment when the test pieces were slid on a mating member made of SUJ2 at the surface pressure of 5.0 kg/cm$^2$ and the sliding speed of 128 m/minute with no lubrication for 100 hours.

(3) Limit PV value

In the wear test, the limit PV values were measured after crystallization treatment when the test pieces were slid on a mating member made of SUJ2 at the sliding speed of 128 m/minute with no lubrication for 100 hours. The limit PV values (kg/cm$^2$—m/min) are indicated in terms of the surface pressures when the friction coefficients exceeded 100× 10$^{-10}$ cm$^3$/kgf m.

(4) Flexural modulus

Flexural moduli (kgf/cm$^2$) were measured under ASTM -D790 at normal temperature and at 230° C.

(5) Change in dimensions due to crystallization treatment

Twenty thrust washer test pieces of 66.5 mm in outer diameter, 37 mm in inner diameter and 2 mm thick (obtained by disc gate forming with the gate diameter being 2.5 mm as measured from the center of the inner diameter and cutting the inner periphery of the pieces obtained) were subjected to crystallization treatment in which they were heated to 320° C. in steps for two hours. The test pieces were checked for (a) standard deviations in outer diameter, (b) rates of shrinkage and (c) presence of warpage as observed with naked eye, before and after the treatment.

As will be apparent from the results shown in Tables 3 and 4, Comparative Examples 1–3, which contained no powdery hardened phenolic resin, showed high friction coefficients, and Comparative Example 4, which contained graphite containing 97% or more of fixed carbon in the amount exceeding the predetermined range, was not moldable. Comparative Example 5, in which the content of fixed carbon in the graphite was less than 97% and Comparative Example 6, which contained no graphite, showed remarkable changes in dimensions when subjected to crystallization treatment. Comparative Examples 7 and 8, which contained a liquid crystal polymer, were poor in limit PV value and wear coefficient.

In contrast, Examples 1–8 according to this invention, which satisfy the required conditions both in terms of the kinds of materials added and their contents, showed sufficiently large limit PV values higher than 1500. Their other properties such as wear coefficient, mechanical strength (flexural modulus), friction coefficient were also satisfactory as sliding parts. Change in dimensions after crystallization treatment was small.

TABLE II

| | Content | Number | Example 1 | 2 | 3 | 4 | 5 | 6 | 7 | 8 |
|---|---|---|---|---|---|---|---|---|---|---|
| % by weight | TPI | (1) | 50 | 70 | 90 | 70 | 70 | 70 | 70 | 70 |
| | Scale graphite | (2) | 50 | 30 | 10 | — | 30 | 30 | 30 | 30 |
| | Round graphite | (3) | — | — | — | 30 | — | — | — | — |
| | EPL graphite | (4) | — | — | — | — | — | — | — | — |
| Part by weight | LCP | (5) | — | — | — | — | — | — | — | 3 |
| | PF-1 | (6) | 20 | 20 | 20 | 20 | — | 5 | 30 | 20 |
| | PF-2 | (7) | — | — | — | — | 20 | — | — | — |
| | PTFE | (8) | 10 | 10 | 10 | 10 | 10 | 5 | 20 | 10 |

TABLE 2

| | Content | Number | Comparative Example 1 | 2 | 3 | 4 | 5 | 6 | 7 | 8 |
|---|---|---|---|---|---|---|---|---|---|---|
| % by weight | TPI | (1) | 50 | 100 | 70 | 40 | 70 | 100 | 100 | 100 |
| | Scale graphite | (2) | 50 | — | 30 | 60 | — | — | — | — |

TABLE 2-continued

|  | Content | Number | Comparative Example | | | | | | | |
|---|---|---|---|---|---|---|---|---|---|---|
|  |  |  | 1 | 2 | 3 | 4 | 5 | 6 | 7 | 8 |
| Part by weight | Round graphite | (3) | — | — | — | — | — | — | — | — |
|  | EPL graphite | (4) | — | — | — | — | 30 | — | — | — |
|  | LCP | (5) | — | — | — | — | — | — | 5 | 20 |
|  | PF-1 | (6) | — | — | — | 20 | 20 | 20 | 20 | 20 |
|  | PF-2 | (7) | — | — | — | — | — | — | — | — |
|  | PTFE | (8) | — | 20 | 10 | 10 | 10 | 5 | 5 | 5 |

TABLE 3

| Item | | Number | Example | | | | | | | |
|---|---|---|---|---|---|---|---|---|---|---|
|  |  |  | 1 | 2 | 3 | 4 | 5 | 6 | 7 | 8 |
| (1) Friction coefficient | | | 0.15 | 0.10 | 0.10 | 0.10 | 0.10 | 0.15 | 0.15 | 0.10 |
| (2) Friction coefficient × $10^{-10}$ | Amorphous | | 15 | 10 | 30 | 50 | 30 | 70 | 70 | 10 |
|  | Crystallization | | 15 | 10 | 30 | 40 | 30 | 60 | 60 | 10 |
| (3) Limit PV value | | | >2000 | >2000 | 1500 | 1500 | >2000 | 1500 | 1500 | >2000 |
| (4) Flexurous modulus | At normal temp. | | 70000 | 55000 | 40000 | 50000 | 55000 | 54000 | 50000 | 55000 |
|  | At 230° C. | | 50000 | 38000 | 23000 | 33000 | 38000 | 36000 | 31000 | 38000 |
| (5) Change in dimension | (a) Outer diameter SD | | 0.010 | 0.010 | 0.015 | 0.015 | 0.010 | 0.015 | 0.020 | 0.010 |
|  | (b) Rate of shrinkage | | 0.6 | 0.7 | 0.8 | 0.7 | 0.7 | 0.7 | 1.0 | 0.7 |
|  | (c) Warpage | | No | No | No | No | No | No | No | No |

TABLE 4

| Item | | Number | Comparative Example | | | | | | | |
|---|---|---|---|---|---|---|---|---|---|---|
|  |  |  | 1 | 2 | 3 | *4 | 5 | 6 | 7 | 8 |
| (1) Friction coefficient | | | 0.25 | 0.40 | 0.10 | — | 0.25 | 0.40 | 0.25 | 0.25 |
| (2) Friction coefficient × $10^{-10}$ | Amorphous | | >1000 | >1000 | 450 | — | 300 | 150 | 200 | 650 |
|  | Crystallization | | >1000 | >1000 | 300 | — | 150 | 50 | 100 | 300 |
| (3) Limit PV value | | | 300 | 300 | 500 | — | 500 | 1000 | 500 | 300 |
| (4) Flexurous modulus | At normal temp. | | 70000 | 30000 | 55000 | — | 35000 | 35000 | 38000 | 42000 |
|  | At 230° C. | | 50000 | 15000 | 38000 | — | 19000 | 19000 | 19000 | 30000 |
| (5) Change in dimension | (a) Outer diameter SD | | 0.010 | 0.280 | 0.020 | — | 0.065 | 0.200 | 0.098 | 0.040 |
|  | (b) Rate of shrinkage | | 0.6 | 4.3 | 1.0 | — | 1.8 | 3.8 | 2.3 | 1.1 |
|  | (c) Warpage | | No | Yes | No | — | Yes | Yes | Yes | No |

*Not moldable

What is claimed is:

1. A resin composition for sliding members comprising 100 parts by weight of:

a polyimide resin composition comprising:

50–90% by weight of a thermoplastic polyimide resin made up of repeating units represented by the following formula, and 50–10% by weight of graphite obtained by graphitizing a non-phenolic resin material and containing 97% or more of fixed carbon;

5–20 parts by weight of tetrafluoroethylene resin; and

5–30 parts by weight of a powdery hardened phenolic resin

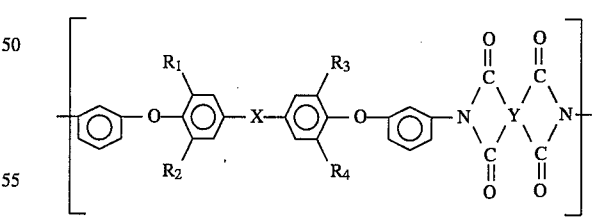

wherein X is a member selected from the group consisting of a direct bond, a hydrocarbon group having a carbon number of 1–10, a hexafluorinated isopropylidene group, a carbonyl group, a thio group and a sulfone group; R1 –R4 are the same or different and are at least one of hydrogen, a lower alkyl group, a lower alkoxy group, chlorine or bromine; and Y is a quadrivalent group selected from the group consisting of an aliphatic group having a carbon number of two or more, a cyclic aliphatic group, a monocyclic aromatic group, a condensed polycyclic aromatic group, and a non-condensed polycyclic aromatic group in which aromatic groups are bonded together directly or through an intermediary moiety.

2. A resin composition for sliding members comprising polyimide resin as claimed in claim 1 wherein said graphite containing 97% or more fixed carbon is scaly natural graphite.

3. A resin composition for sliding members comprising polyimide resin as claimed in either claims 1 or 2 further comprising 1 to 5 parts by weight of at least one thermotropic liquid crystal polymer selected from polymers having the following repeating units:

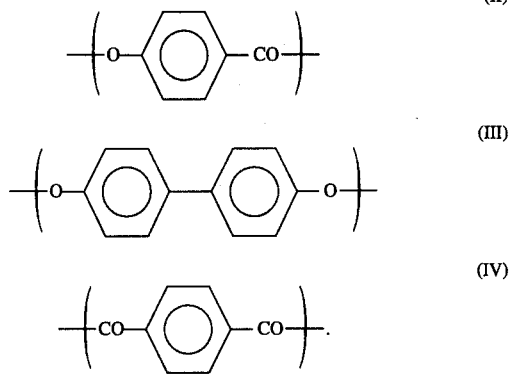

4. A sliding member comprising a composition comprising 100 parts by weight of:
   a polyimide resin composition comprising:
   50–90% by weight of a thermoplastic polyimide resin made up of repeating units represented by the following formula, and
   50–10% by weight of graphite obtained by graphitizing a non-phenolic resin material and containing 97% or more of fixed carbon;
   5–20 parts by weight of tetrafluoroethylene resin; and
   5–30 parts by weight of a powdery hardened phenolic resin

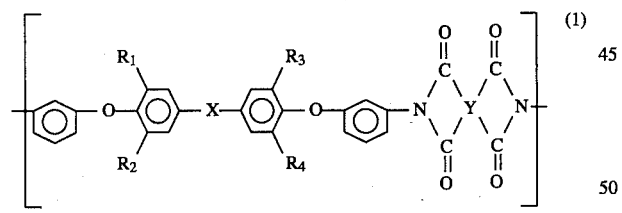

wherein X is a member selected from the group consisting of a direct bond, a hydrocarbon group having a carbon number of 1–10, a hexafluorinated isopropylidene group, a carbonyl group, a thio group and a sulfone group; R1–R4 are the same or different and are at least one of hydrogen, a lower alkyl group, a lower alkoxy group, chlorine or bromine; and Y is a quadrivalent group selected from the group consisting of an aliphatic group having a carbon number of two or more, a cyclic aliphatic group, a monocyclic aromatic group, a condensed polycyclic aromatic group, and a non-condensed polycyclic aromatic group in which aromatic groups are bonded together directly or through an intermediary moiety.

5. A sliding member as claimed in claim 4 wherein said graphite containing 97% or more fixed carbon is scaly natural graphite.

6. A sliding member as claimed in claim 4 further comprising 1 to 5 parts by weight of at least one thermotropic liquid crystal polymer selected from polymers having the following repeating units:

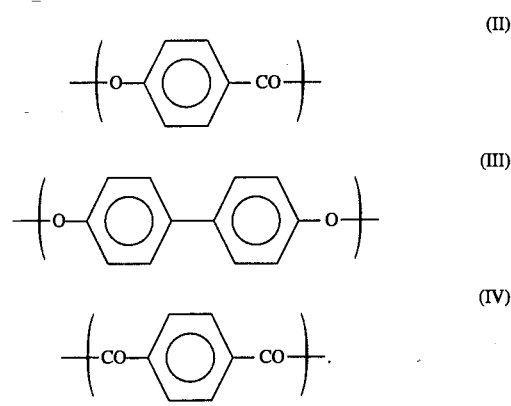

7. A sliding member as claimed in claim 5 further comprising 1 to 5 parts by weight of at least one thermotropic liquid crystal polymer selected from polymers having the following repeating units:

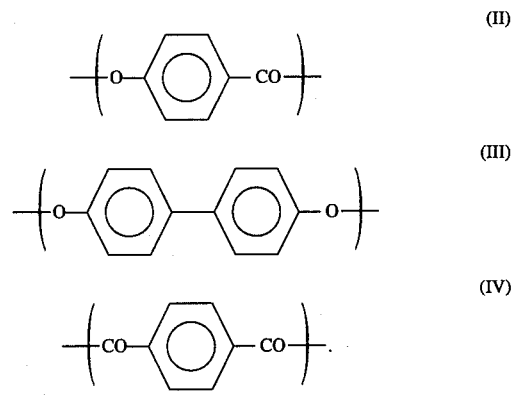

* * * * *